(12) United States Patent
Tomas Puchades

(10) Patent No.: US 10,525,940 B2
(45) Date of Patent: Jan. 7, 2020

(54) INTERNAL WASHING DEVICE FOR CONTAINERS

(71) Applicant: ISTOBAL, S.A., La Alcudia (ES)

(72) Inventor: Yolanda Tomas Puchades, La Alcudia (ES)

(73) Assignee: Istobal, S.A., La Alcudia (Valencia) (ES)

( * ) Notice: Subject to any disclaimer, the term of this patent is extended or adjusted under 35 U.S.C. 154(b) by 82 days.

(21) Appl. No.: 15/982,085

(22) Filed: May 17, 2018

(65) Prior Publication Data

US 2018/0334142 A1 Nov. 22, 2018

(30) Foreign Application Priority Data

May 18, 2017 (ES) .................................. 201730706

(51) Int. Cl.
| | | |
|---|---|---|
| *B60S 3/00* | (2006.01) | |
| *B08B 9/093* | (2006.01) | |
| *B05B 13/04* | (2006.01) | |
| *F16H 19/04* | (2006.01) | |

(52) U.S. Cl.
CPC ............ *B60S 3/008* (2013.01); *B05B 13/041* (2013.01); *B08B 9/093* (2013.01); *F16H 19/04* (2013.01); *F16H 2019/046* (2013.01)

(58) Field of Classification Search
CPC ....................................................... B60S 3/008
See application file for complete search history.

(56) References Cited

U.S. PATENT DOCUMENTS 4,112,533 A * 9/1978 Brager .................... B60S 3/008
15/53.2

FOREIGN PATENT DOCUMENTS

| DE | 102012024887 A1 | 6/2014 |
| EP | 0256699 A2 | 2/1988 |
| ES | 2398275 A1 | 3/2013 |
| GB | 1504550 | 3/1978 |
| KR | 9621406 A | 7/1996 |

* cited by examiner

*Primary Examiner* — Michael E Barr
*Assistant Examiner* — Jason P Riggleman
(74) *Attorney, Agent, or Firm* — The Webb Law Firm

(57) ABSTRACT

The invention relates to an internal washing device for containers including a base with a structure including telescopically extendable sections and in which at least one cleaning element is housed. The base includes a drive shaft, each section includes at least one toothed longitudinal segment configured to engage with at least one pinion fastened to the drive shaft. The sections include a push pawl. The initial section incorporates a support element on the forward end, and the additional sections incorporate a pull pawl and a recess for the fastening of the corresponding push pawl, such that the drive shaft has the ability to operate all the sections without needing to move.

14 Claims, 17 Drawing Sheets

INTERNAL WASHING DEVICE FOR CONTAINERS

CROSS-REFERENCE TO RELATED APPLICATION

This application claims priority to Spanish Patent Application No. P201730706 filed May 18, 2017, the disclosure of which is hereby incorporated in its entirety by reference.

BACKGROUND OF THE INVENTION

Field of the Invention

The present invention relates to an internal washing device for containers, trailers, truck boxes and the like that incorporates a novel system that can be extended to access the inside of the space to be washed. It can be actuated by a single motor and it incorporates a support that provides an inclination at which the inside of the container can be accessed even if it is not aligned with the device.

It has a special application in the scope of the industry of apparatuses for cleaning and/or disinfecting vehicles.

Description of Related Art

A wide variety of methods related to washing vehicles, trailers and even containers are known in the current state of the art.

More specifically, the search is carried out when devices aimed at cleaning the inside of containers in general are involved. This task is crucial in order to reuse the containers in the transport and storage of different types of products, especially given the traces they leave behind, either due to spills or rubbing of both liquid and solid products that would contaminate products transported afterwards.

U.S. Pat. No. 1,504,550 describes an internal washing device for containers basically formed by an extendable crane jib or arm, supported horizontally on a platform. The jib incorporates wheels on the free end thereof to move inside the container actuated by a motor. The structure of the jib incorporates hoses or cleaning mechanisms suitable for cleaning.

Patent document DE-102012024887 describes a vehicle that incorporates a front arm that incorporates several cleaning devices. The vehicle is introduced inside the container and it proceeds to wash the container.

Patent document ES-2398275 describes a vehicle that incorporates a horizontal roller that can be lifted on the front part and two vertical rollers on each side of the horizontal roller. The vehicle is introduced into the container and it proceeds to wash the inner surface of the container in a way that is similar to that used by machines for the external washing of vehicles.

Patent document EP-0256699 describes a device that incorporates a coiled hose connected to a vehicle. The vehicle is introduced into the container and pressure is provided to the hose to proceed to wash the inside.

However, these inventions have several drawbacks, such as the fact that they have a structure that is very difficult to manipulate, a procedure that is very ineffective or a device that is difficult to move to different work stations.

Patent document KR-0138696, which describes a device that has a base on which several telescopically extendable U-shaped beams stacked one inside of another are stacked. To carry out the extending movement, the U-shaped beams incorporate toothed external edges. A pinion, actuated by a motor, engages with the corresponding beam. When the beam reaches the end of its path, the pinion descends to engage with the following beam, and so on until reaching the final beam. To retract the beams, the same shall occur, such that in this case the pinion rises to engage with the following beam until all of the beams are retracted.

This movement of the pinion is carried out by means of a device that incorporates a sphere and spring pawl that has several problems. Firstly, it implies a limitation on the force with which the extended sections move, the resistance to the disengagement to which the pawl is adjusted by the traction motor itself when retracting the beams having to be overcome. This system also has the drawback that, if a pawl of one of the already extended beams is released, the synchronization of the teeth of the involved beams would be lost, leading to locking at the time of the corresponding engagement. This synchronization is also lost due to the movement of the pinion to engage with the different beams.

SUMMARY OF THE INVENTION

The present invention shows substantial improvement with respect to the device and process for retracting the beams in view of the above-referenced patent documents, the device incorporating toothed sections whose ends comprise pull and push pawls that act on the following section that is going to start moving and that, due to the grip positions thereof, ensure the synchronization of each section to be engaged with the pinions of the drive shaft at all times, allowing the extending and retracting movement to be carried out as many times as established and making the telescopic movement of the different sections to resemble that of a rail of a single section. Likewise, interference in the movement of the different sections would not affect the operations of the device having to stop it, but instead it would only create the need to remove the interference.

Another advantage is due to the fact that a drive shaft has pinions that directly engage with each toothed section without needing to move.

The present invention describes an internal washing device for containers comprising a base with a structure including a plurality of telescopically extendable sections from a forward end to a rear end and in which at least one cleaning element is housed.

The base also incorporates a system for retracting the cleaning element in order to be able to deploy it along the sections when they are extended and to house it once the extendable sections are retracted. On the other hand, the free end of the initial section incorporates an element for fastening the cleaning element.

The structure incorporates an intermediate support that enables the device to absorb misalignments between the floor of the container to be washed and the floor where the device rests. Thus, the support is located longitudinally at a point between the center of gravity and the working end of the device, such that the working end is always raised, resting on the opposite end. As the sections are extended, the center of gravity moves until it reaches a place where the wheels of the initial section rest on the floor of the container to be washed.

The base also comprises a drive shaft, activated by a motor, on which at least one pinion and at least one set of elements formed by a brake and a cam is fastened.

Each section longitudinally comprises a toothed segment intended to engage with the pinion.

Each section comprises a push pawl and a stop on the rear end.

The initial section incorporates a support element on the forward end.

Each remaining section incorporates a head and a pull pawl with a bolt on the rear end, in addition to a recess.

The toothed segments of the sections are parallel and at the same height with respect to the drive shaft, which enables engagement of the toothed segments with the pinions without needing additional movements, the shaft of the motor being able to be an extension of the drive shaft, which leads to the use of fewer components and having less breakdowns.

The push pawls incorporate a protrusion with a width configured so that the first and second push pawls fit into the first and second recesses and at the same time come in contact with the first and second cams, respectively.

Furthermore, both the first and second stops and the first and second heads comprise a recess for housing the first and second bolts, respectively.

The device can incorporate wheels to be moved. Thus, in addition to being installed on a loading dock, it can also be moved to the desired location to proceed to lock the wheels when starting the action and to ensure the immobilization thereof.

BRIEF DESCRIPTION OF THE DRAWINGS

To complete the description of the invention, and for the purpose of helping to make the characteristics thereof more readily understandable, according to a preferred exemplary embodiment thereof, a set of drawings is included where, by way of illustration and not limitation, the following figures have been represented.

FIG. 2a shows a side view of the device with the exploded sections and base.

FIG. 2b shows a front view of the device represented in FIG. 2a.

Figure 1:
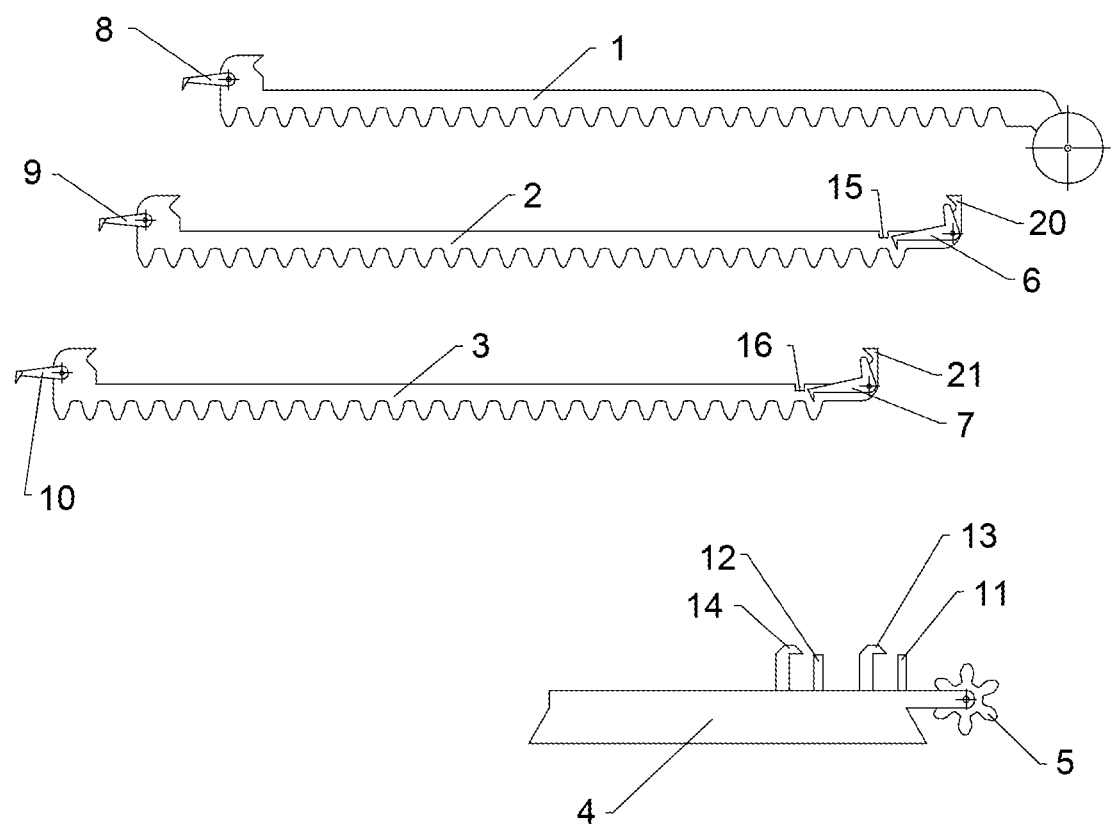
FIG. 1 shows an exploded side view of the three sections that make up the telescopic arm of the device of the invention and the base in a schematic way.

A list of the references used in the figures is provided below:
1. Initial section.
2. First additional section.
3. Second additional section.
4. Base.
5. Pinion.
6. First pull pawl.
7. Second pull pawl.
8. First push pawl.
9. Second push pawl.
10. Third push pawl.
11. First brake.
12. Second brake.
13. First cam.
14. Second cam.
15. First recess.
16. Second recess.
17. First stop.
18. Second stop.
19. Third stop.
20. First head.
21. Second head.
22. First bolt.
23. Second bolt.
24. Support.
25. Motor.
26. Drive shaft.

DESCRIPTION OF THE INVENTION

Considering the numbering adopted in the figures, the washing device of the invention is described below, describing the simplifications that have been made in the figures.

The washing device of the invention is intended for the internal washing of containers, truck boxes, trailers and the like, although, throughout the specification, reference is only made to containers.

The washing device is made up of a base (4) with a structure that supports a telescopic arm formed by several sections (1, 2, 3) which is introduced into the container to be washed. The base (4) incorporates the very components of the washing system such as, for example, a hose connected to a water dispenser. This hose is fastened to the extendable arm as described later.

The base (4) can be fastened to a loading dock or be transported to a specific location where there is a container to be cleaned. It can also incorporate wheels for the movement thereof with a locking mechanism that disables them when necessary.

In the preferred embodiment that is described, it is considered that the extendable arm is made up of three sections (1, 2, 3), although the number can differ.

In any case, the device, as mentioned above, incorporates a hose connected to a water dispenser or fountain that is fastened to the structure of the base (4) and the end of which is fastened to the initial section (1) that can be extended to clean the container. The hose in the base (4) can be coiled in a device that releases or retracts it depending on whether the sections (1, 2, 3) of the arm extend or retract.

This device can be activated, for example, by means of a spring.

The mechanism for extending and retracting the sections (1, 2, 3) of the arm is actuated by means of a motor (25) connected to the drive shaft (26) that incorporates at least one pinion (5) for connection thereof to the sections (1, 2, 3).

Each section (1, 2, 3) of the arm is configured as a U-shaped plate comprising a toothed segment along the section (1, 2, 3) intended to engage with the pinions (5) of the drive shaft (26), which is fastened on the base (4) together with the motor (25).

In one preferred embodiment, each section (1, 2, 3) incorporates two toothed segments.

In another preferred embodiment, the drive shaft (26) incorporates a pinion (5) for each section (1, 2, 3).

In another preferred embodiment, the drive shaft (26) incorporates a pinion (5) for each toothed segment of each section (1, 2, 3).

The change in direction of the movement of the sections (1, 2, 3) is simply carried out by inverting the direction of rotation of the motor (25).

As shown in FIG. 1, the device comprises a base (4) with a structure comprising at least one pinion (5), a set formed by a first brake (11) and a first cam (13) and a second set formed by a second brake (12) and a second cam (14).

The sections (1, 2, 3) are positioned in parallel, such that the telescopic movement of the different sections (1, 2, 3) resembles that of a rail of a single section (1, 2, 3) as described later.

Each section (1, 2, 3) incorporates a stop (17, 18, 19) and a tilting push pawl (8, 9, 10) on the rear end with a protrusion on the end.

The first additional segment (2) and the second additional segment (3) incorporate, on the other end, a tilting L-shaped pull pawl (6, 7) that incorporates a protrusion on the end of one of the flanges thereof and a bolt (22, 23), on the end of the other flange, perpendicular to the surface, which is why it is not represented in FIG. 1. On the other hand, the initial section (1) incorporates a wheel for supporting the complete device on the free end.

Figures 2A, 2B:
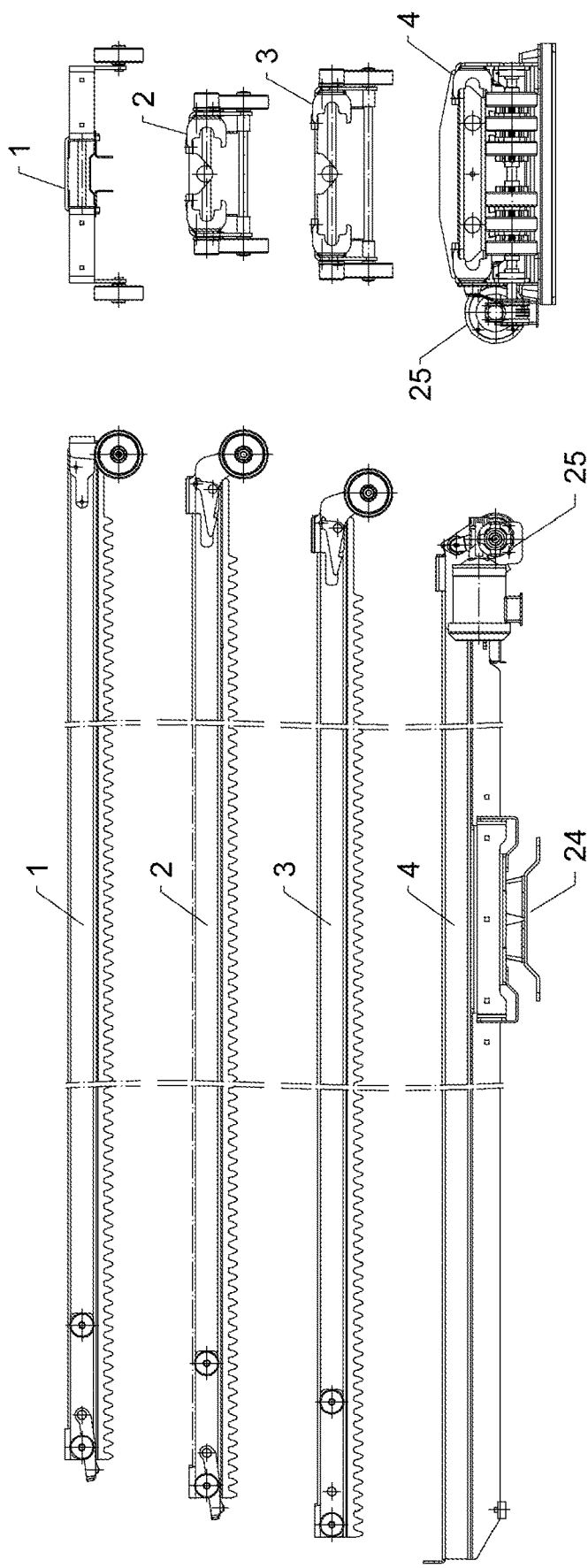

FIGS. 2a and 2b show three exploded sections (1, 2, 3) and the base (4) with the structure where the sections (1, 2, 3) are housed, showing a support (24) for fastening to the floor and the motor (25) responsible for activating the pinion (5) in side and front views, respectively.

Figure 3:
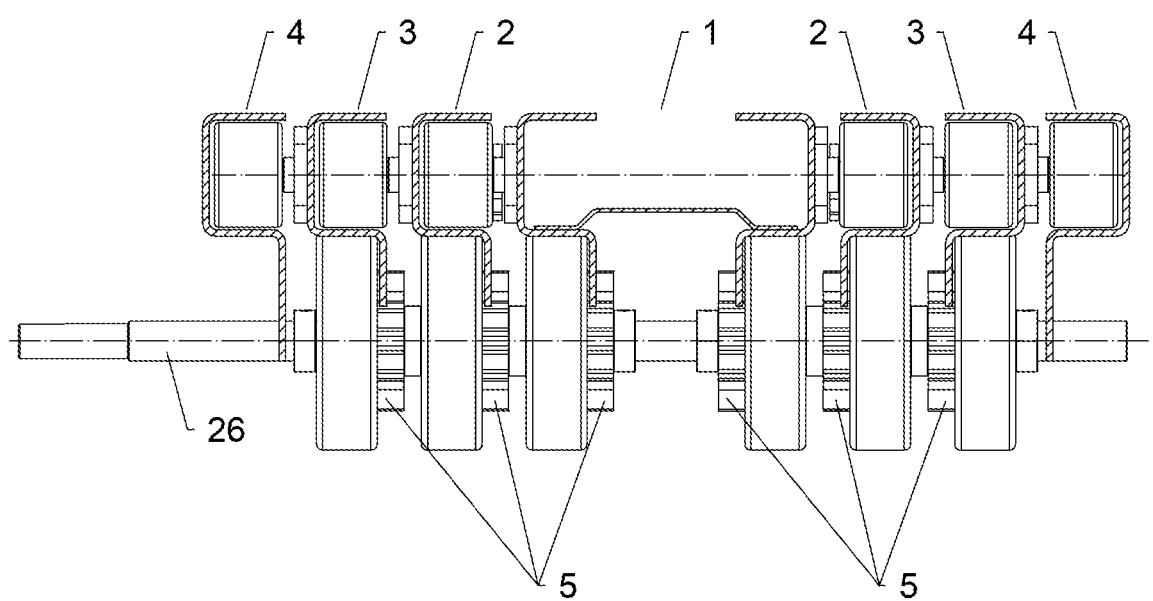
FIG. 3 shows a front cross section view of the device where the base and the different sections with the corresponding toothed segments thereof engaging with the respective pinions of the drive shaft can be seen.

FIG. 3 shows a cross section view of the base (4) and the three sections (1, 2, 3) in a form of representation that incorporates two toothed longitudinal segments for each section (1, 2, 3) where the drive shaft (26) incorporates the same number of pinions (5), such that each toothed segment engages with a pinion (5).

Figure 4:
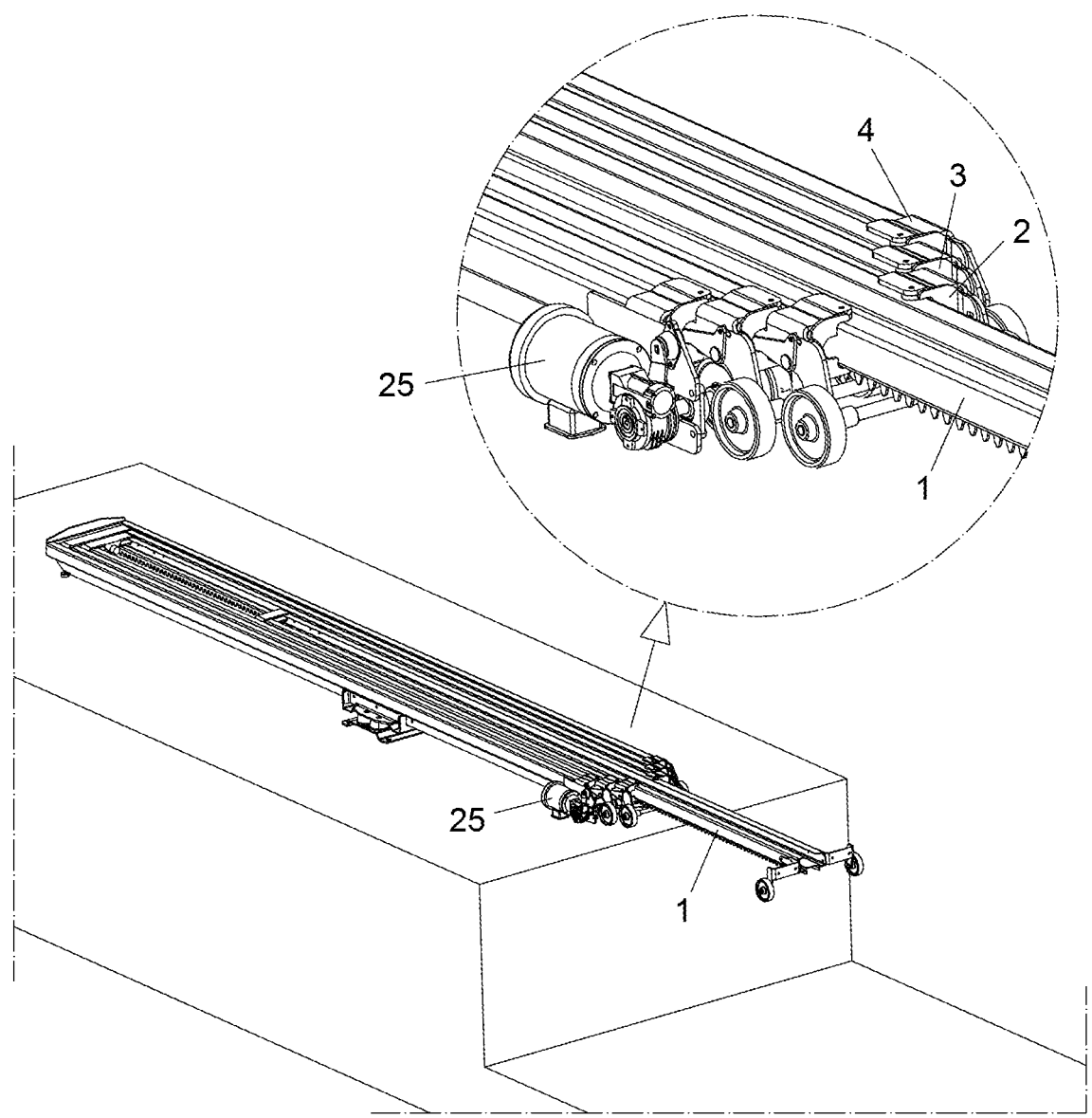
FIG. 4 shows the device of the invention located on a loading dock with an enlargement that shows the end where the movement is produced.

FIG. 4 shows the device located on a loading dock with the initial section (1) in the extending process. In this figure, it can be seen how each segment (1, 2, 3) incorporates a pair of wheels on the forward end, such that the structure does not need to be configured to support all the weight of the three sections (1, 2, 3) when they are extended, but rather each section (1, 2, 3) only supports its own weight.

FIGS. 5a-5d show the effect of the support (24) of the device due to the length it has. The support (24) is away from the position of the center of gravity of the device, such that it is never going to be horizontal. On the contrary, the support (24) is in a position closer to the working end, supported on the opposite end. This inclination prevents problems with aligning a container with the floor of the loading dock where the device is located.

Figure 5A:
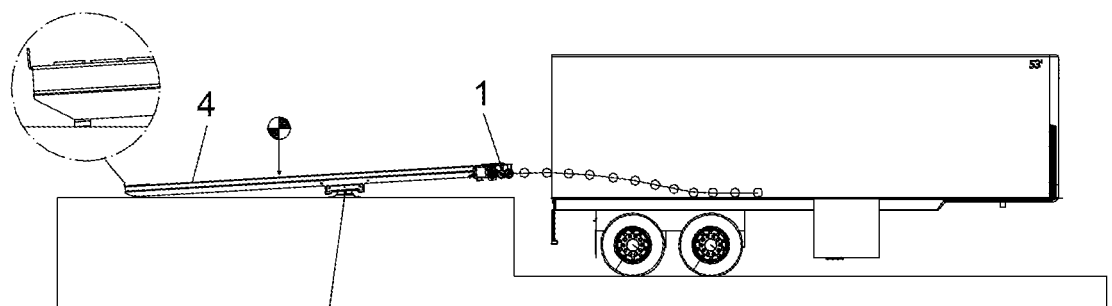
FIGS. 5a-5d show different states of the process of extending the sections of the device, showing the effect of the support.

As shown in FIG. 5a, in the resting position, the device is supported on the support (24) and the end opposite the working area. This figure shows the progression of the end of the initial section (1) once it begins to extend with points, forming a parabola that ends being supported on the floor of the container.

Figure 5B:
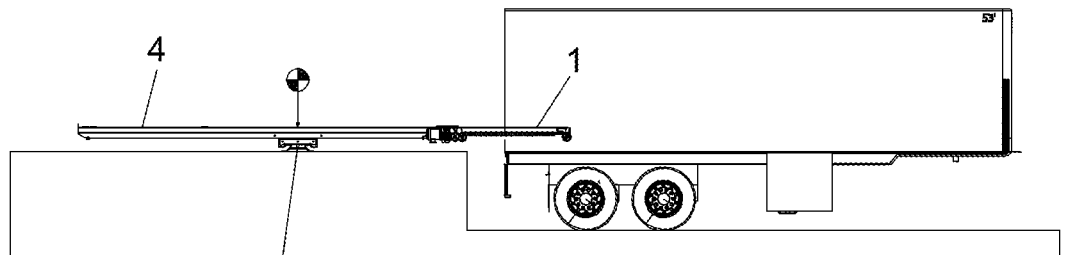
Figure 5C:
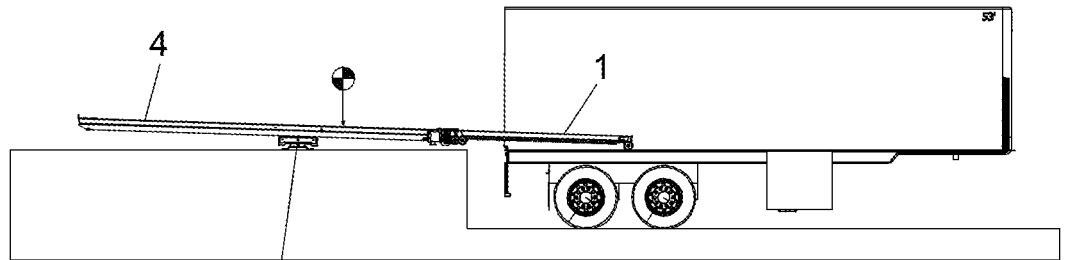
Figure 5D:
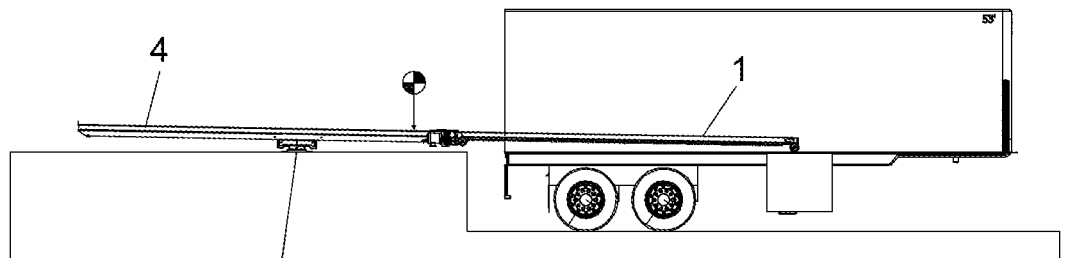

As shown in FIG. 5b, the device is horizontal when a specific length of the initial section (1) has been extended. At this time, the device will continue to tilt, such that the wheels of the free end of the initial section (1) rest on the floor of the container, as shown in FIG. 5c. Thus, as the different sections (1, 2, 3) are extended, the device will continue to rest on the floor of the container, as shown in FIG. 5d, until they are completely extended, either by means of the wheels of the initial section (1) or by also resting on the wheels of the other sections (2, 3). The device behaves in a way that is similar to movement in the opposite direction, when the sections (1, 2, 3) are retracted to end in the initial position.

The operations of the device are described below.

Figure 6:
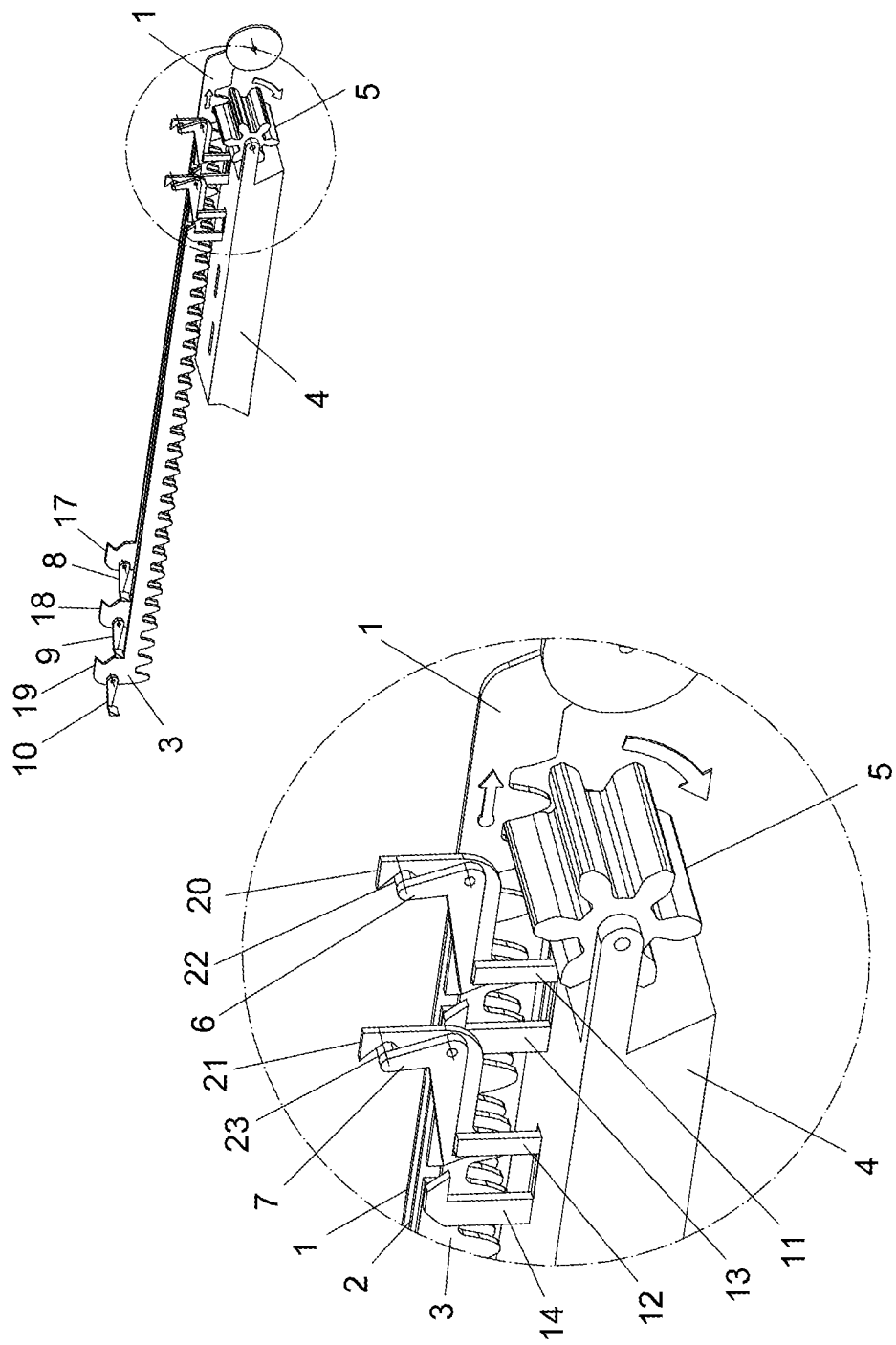
FIGS. 6 to 17 show a perspective view of the sections assembled on the base in the different phases of extending and retracting the three sections together with an enlargement of the affected area at all times.

FIG. 6 shows the machine with the sections (1, 2, 3) in a completely retracted position. The protrusions of the pull pawls (6, 7) are adjusted in the corresponding brakes (11, 12), anchoring the corresponding sections (2, 3). Thus, upon activating the pinion (5) by means of the motor, only the initial section (1) is deployed, being extended to the maximum length thereof.

Figure 7:
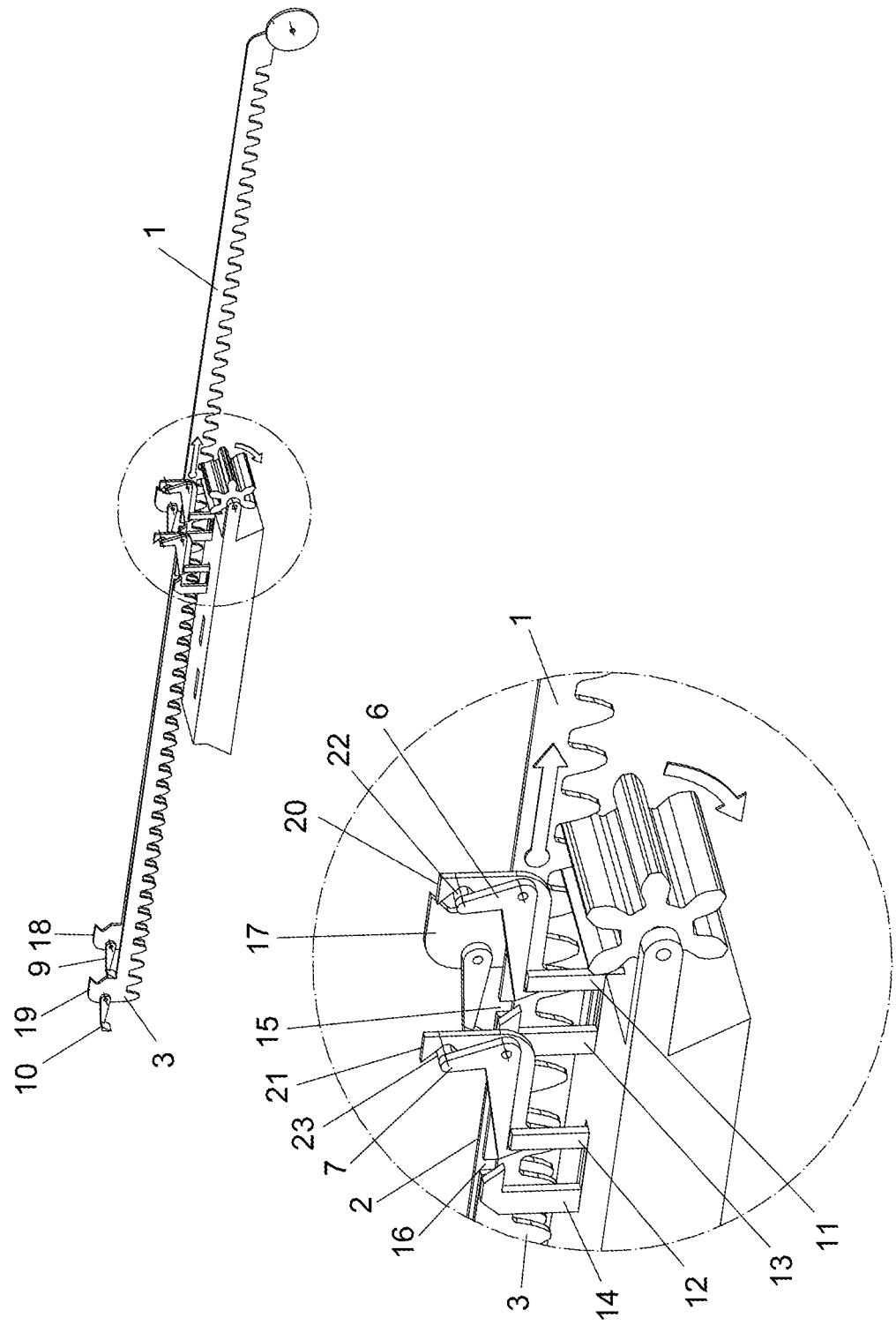
Figure 8:
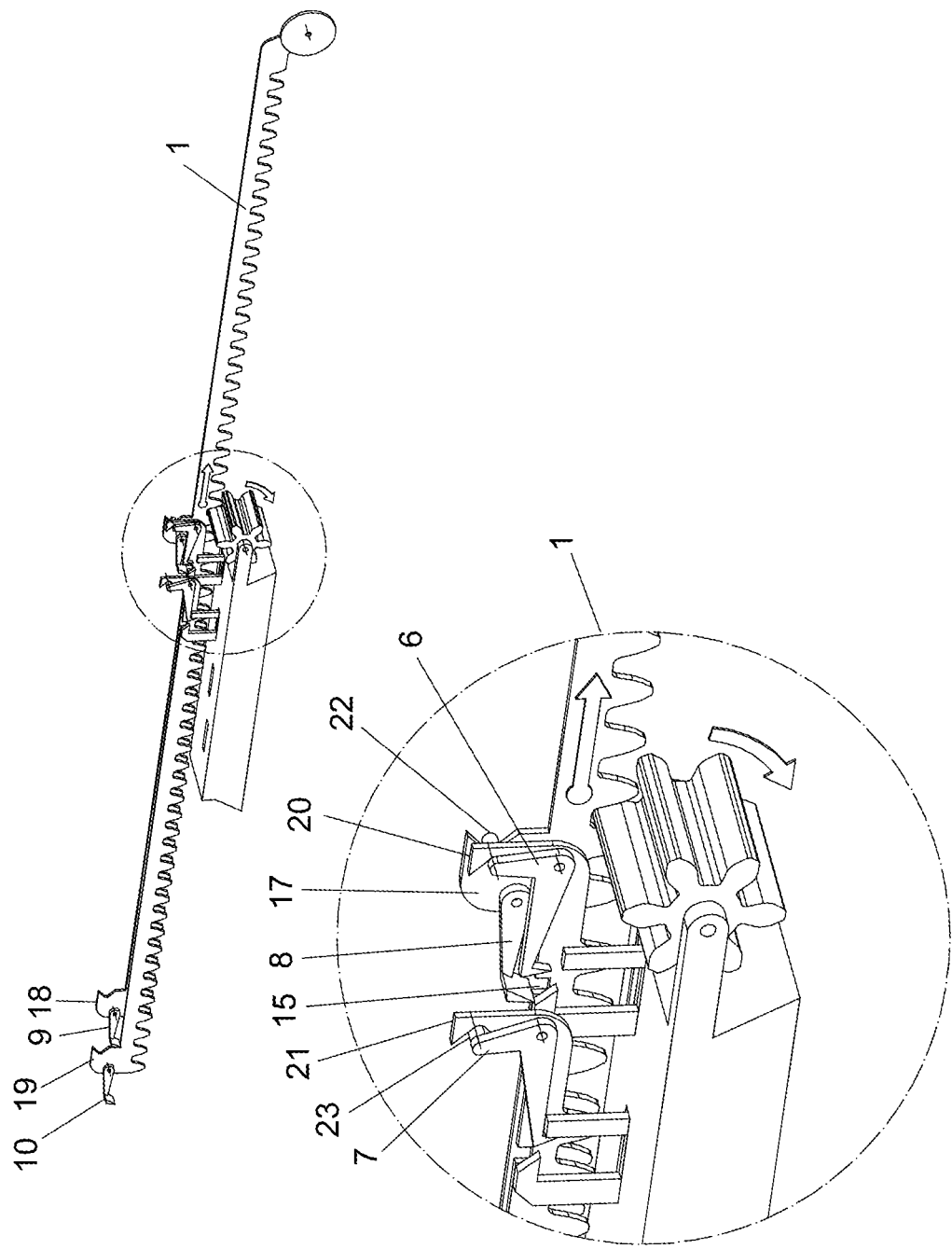

FIG. 7 shows the situation of the initial section (1) moments before it is completely extended. The first stop (17) comes in contact with the first bolt (22) making the first pull pawl (6) rotate over its entire path until coming in contact with the first head (20). The rotation of the first pull pawl (6) releases the first additional section (2) of the first brake (11), being arranged to be pulled by the initial section (1), as shown in FIG. 8.

Figure 9:
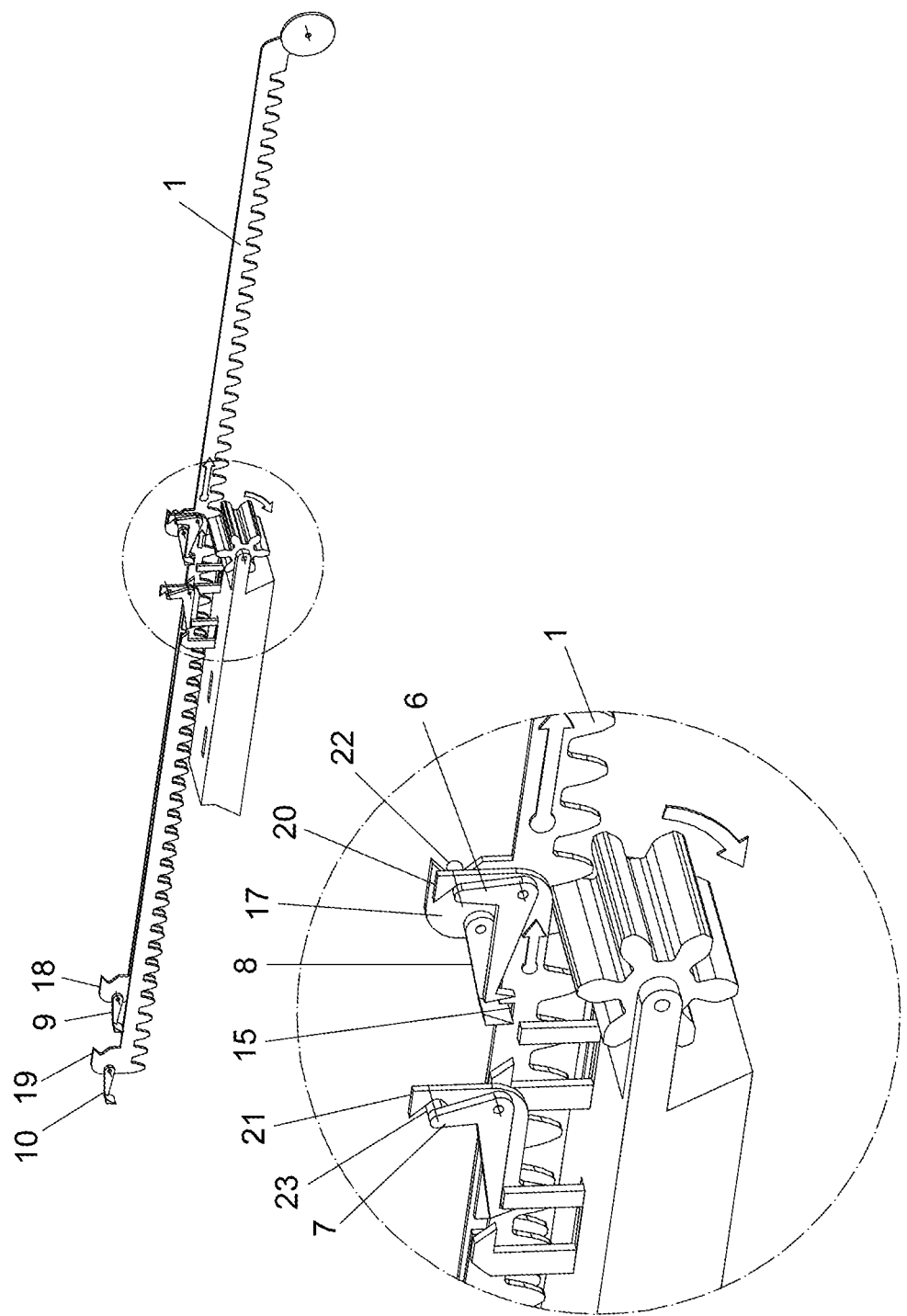

FIG. 9 shows how the pinion (5) stops engaging with the initial section (1) to engage with the first additional section (2), which pushes the initial section (1) due to the fact that, at that moment, the protrusion of the first push pawl (8) has fit into the first recess (15).

Figure 10:
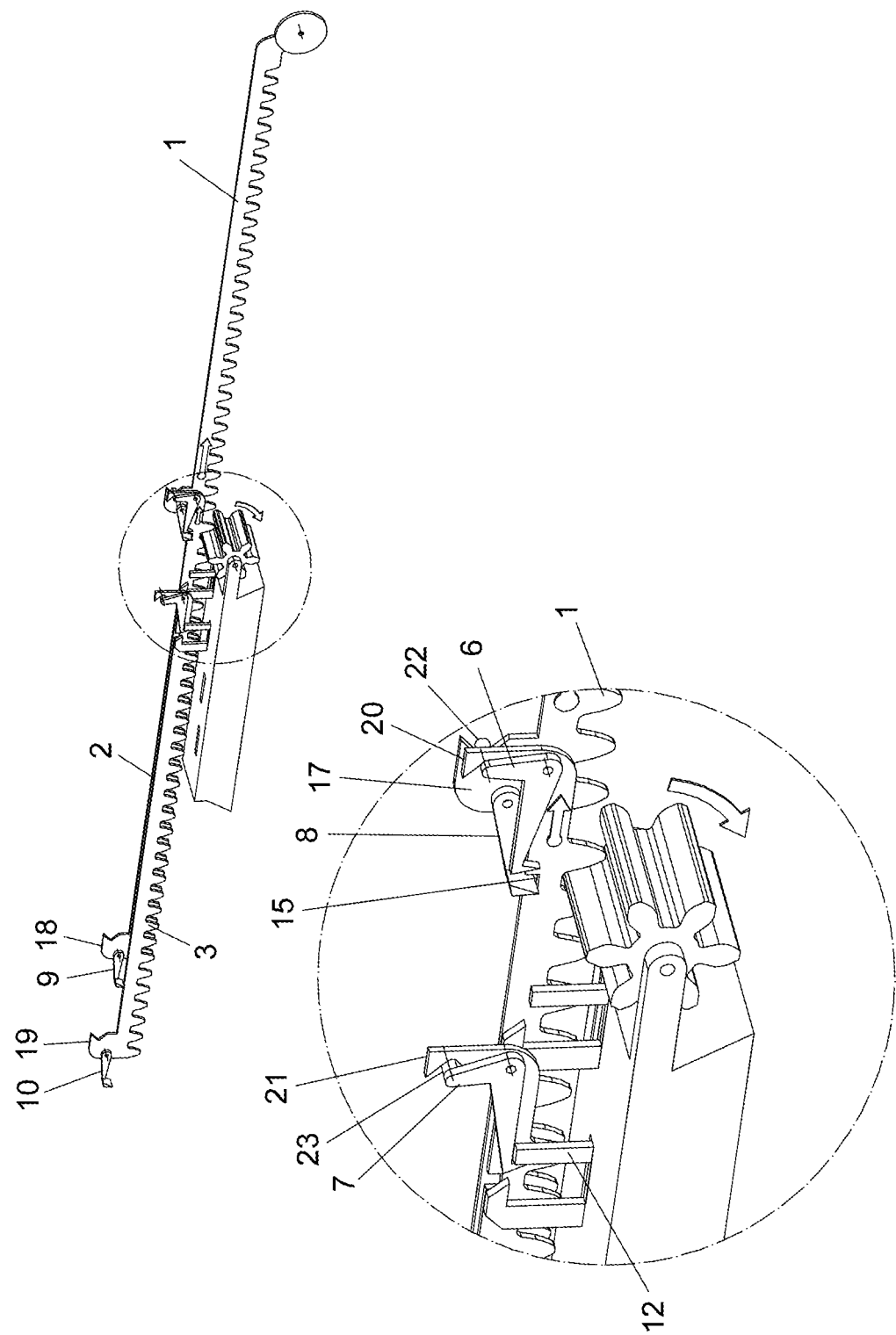

FIG. 10 shows the first additional section (2) being expanded and moving the initial section (1) and the second additional section (3) still being immobile, since the second pull pawl (7) is anchored to the second brake (12).

Figure 11:
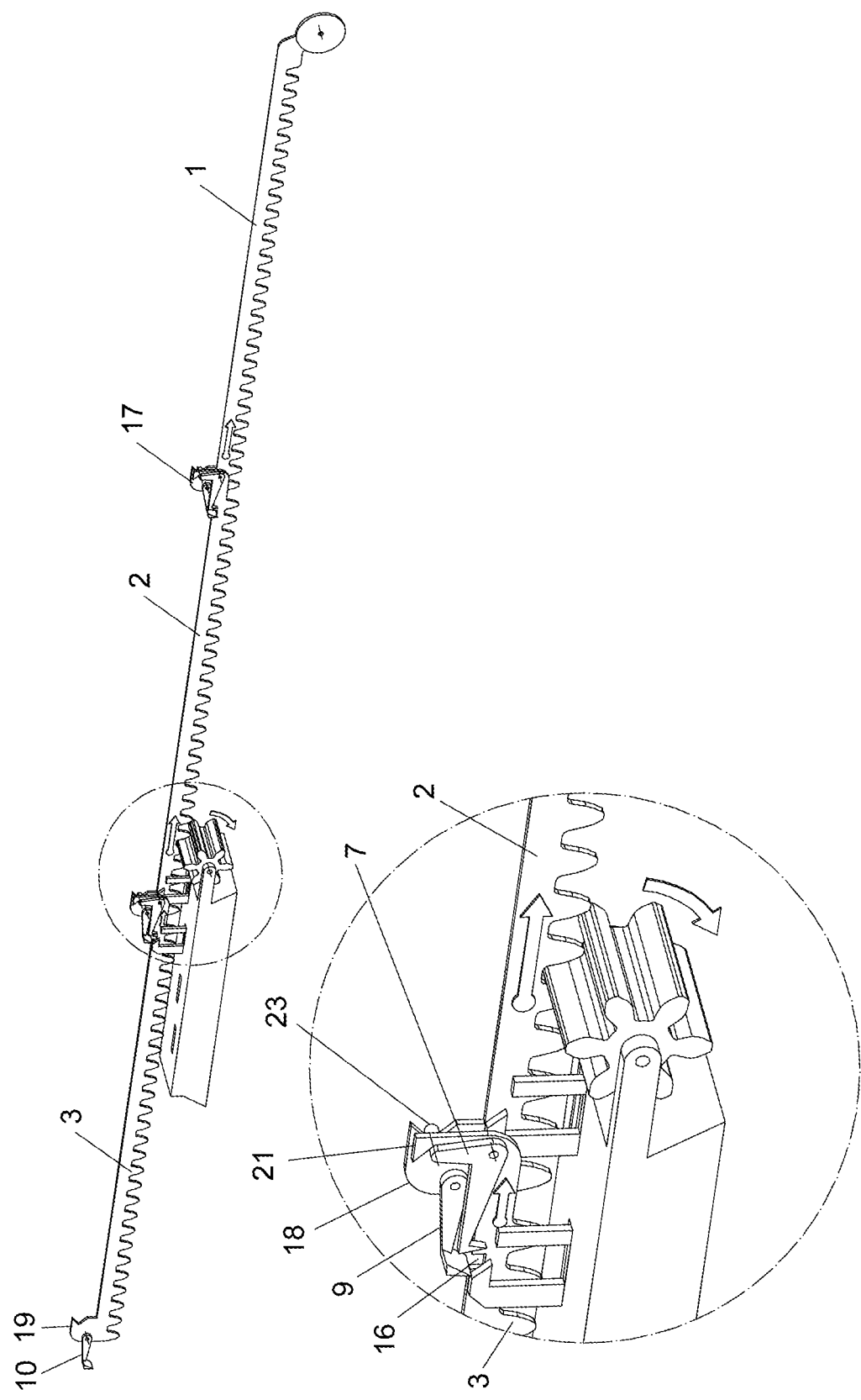

FIG. 11 shows the situation of the first additional section (2) moments before it is completely extended. The second stop (18) comes in contact with the second bolt (23) making the second pull pawl (7) rotate throughout its entire path until coming in contact with the second head (21). The rotation of the second pull pawl (6) releases the second additional section (3) of the second brake (12), being arranged to be pulled by the first additional section (2).

Figure 12:
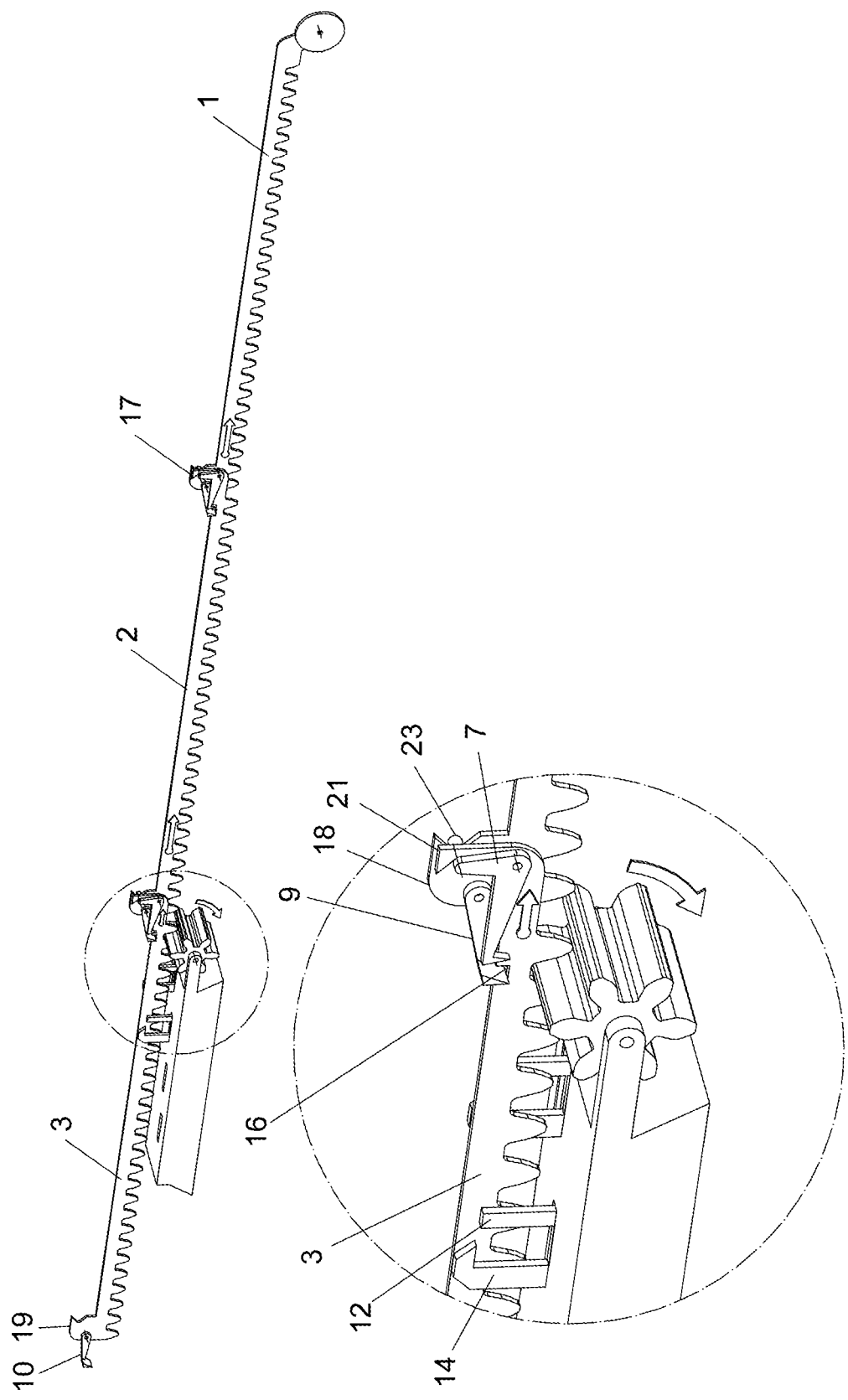

FIG. 12 shows how the pinion (5) engages with the second additional section (3), which pushes the first additional section (2) due to the fact that, at that moment, the protrusion of the second push pawl (9) has fit into the second recess (16). The first additional segment (2) continues pulling the initial section (1).

Therefore, the second additional section (3) reaches the end of its path, marked by a position determined beforehand that can be defined by an element, not shown in the figures, on which the protrusion of the third push pawl (10) or the third stop (19) hooks, such that the movement of the second additional section (3) in that direction is limited and it is not necessary to create a new component in the second additional section (3) that distinguishes it from the first additional section (2). This situation can be extended to an arm that incorporates a greater number of sections (1, 2, 3), where the last section does not have to be different from the intermediate sections. Thus, only the initial section (1) is different from the rest.

Once the end of the container is reached and cleaning has finished, the movement of retracting the sections (1, 2, 3) is activated.

Figure 13:
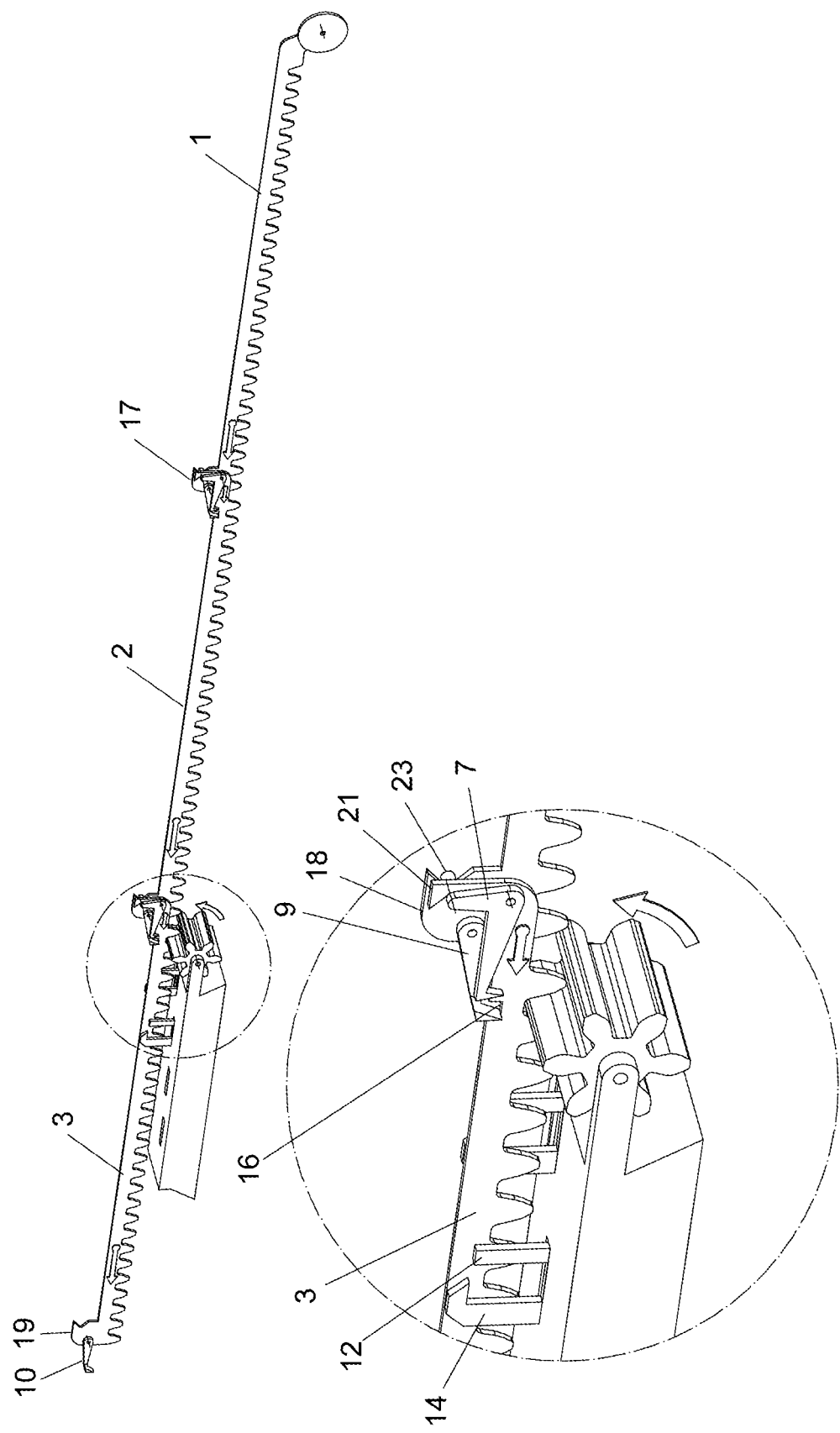

FIG. 13 shows the movement of retracting the second additional section (3), which pulls the first additional section (2) by means of pushing the second bolt (23) through the second head (21), as occurs between the first additional section (2) and the initial section (1). The push pawls (8, 9) do not have carry out any function in this case.

Figure 14:
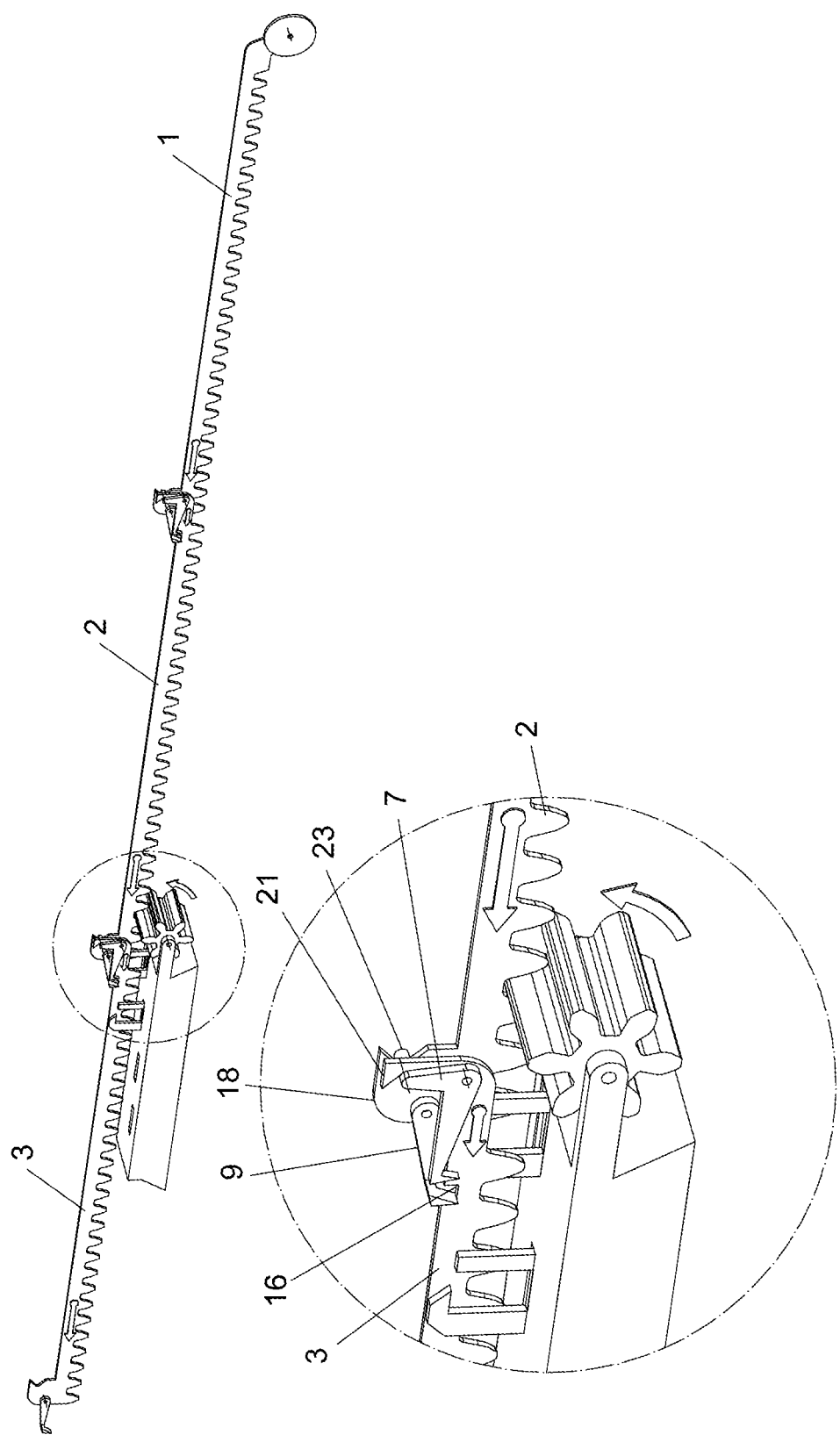
Figure 15:
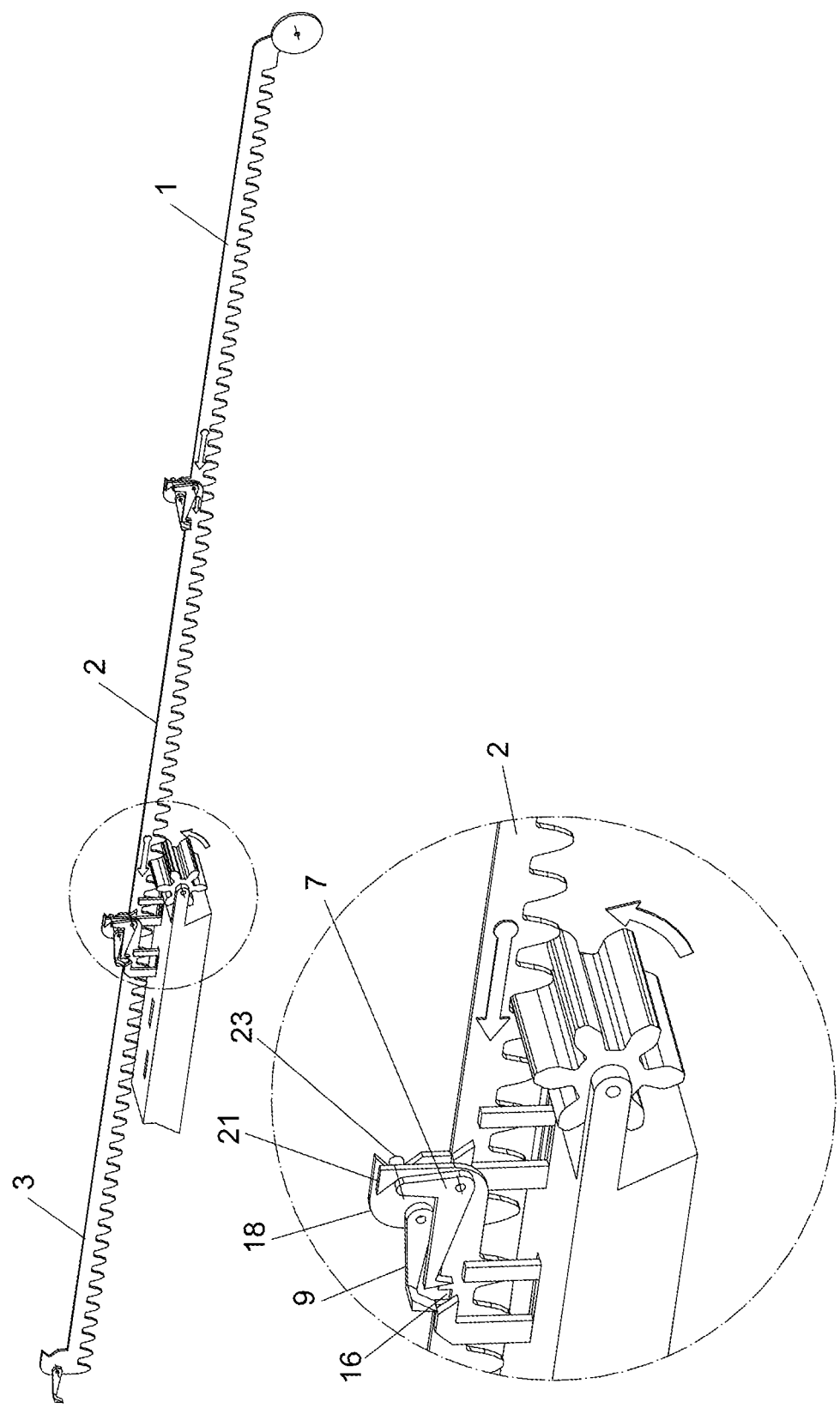

FIG. 14 shows how the pinion (5) has started to engage with the first additional section (2). The second additional section (3) is still pushed by the pinion (5), since the second push pawl (9) is still anchored to the second recess (16). This situation lasts until the second push pawl (9) comes in contact with the second cam, as shown in FIG. 15, which releases the second push pawl (9) and ends the movement of the second additional section (3).

Figure 16:
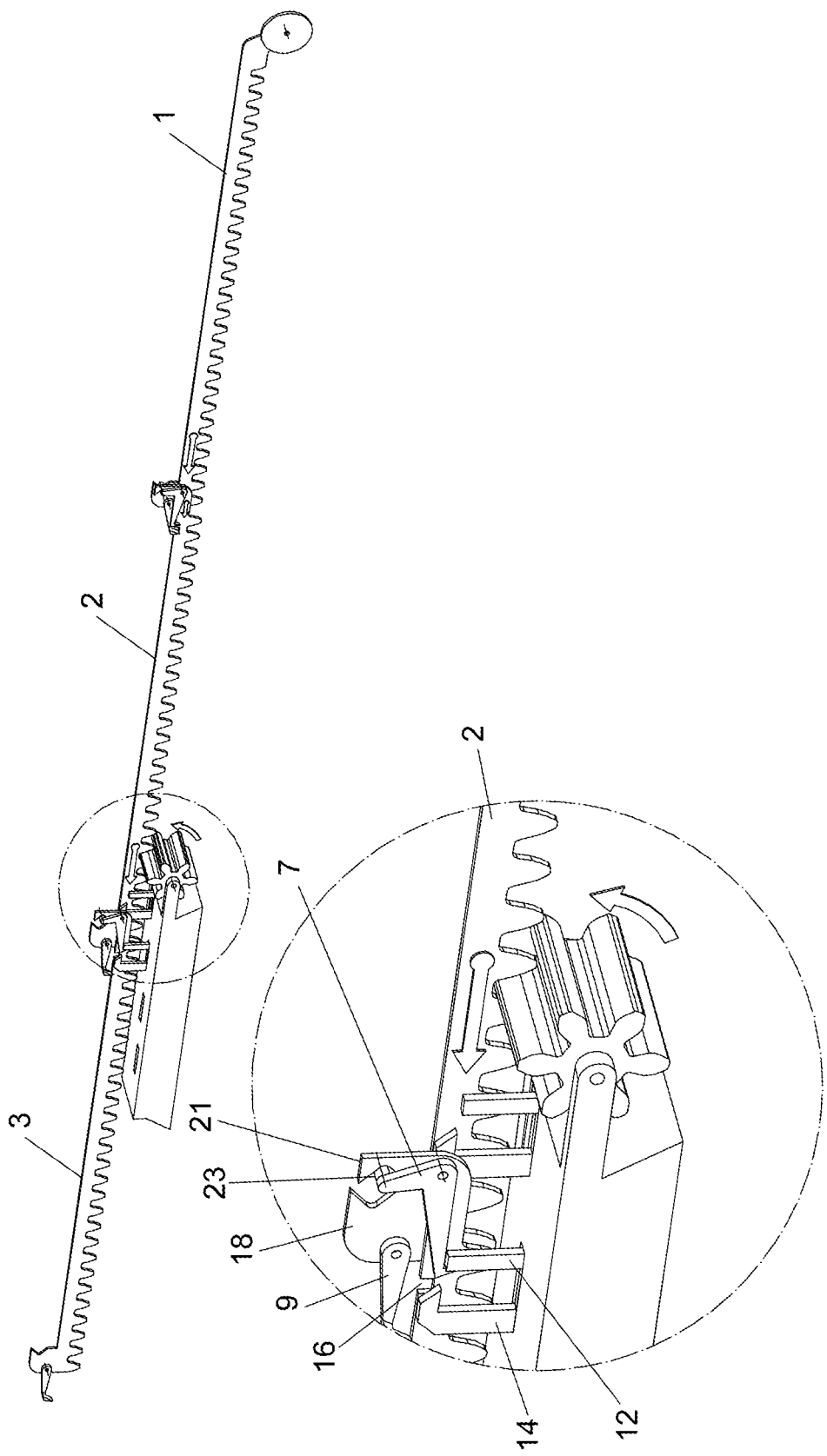

FIG. 16 shows the movement of the first additional section (2) pushed by the pinion (5).

Figure 17:
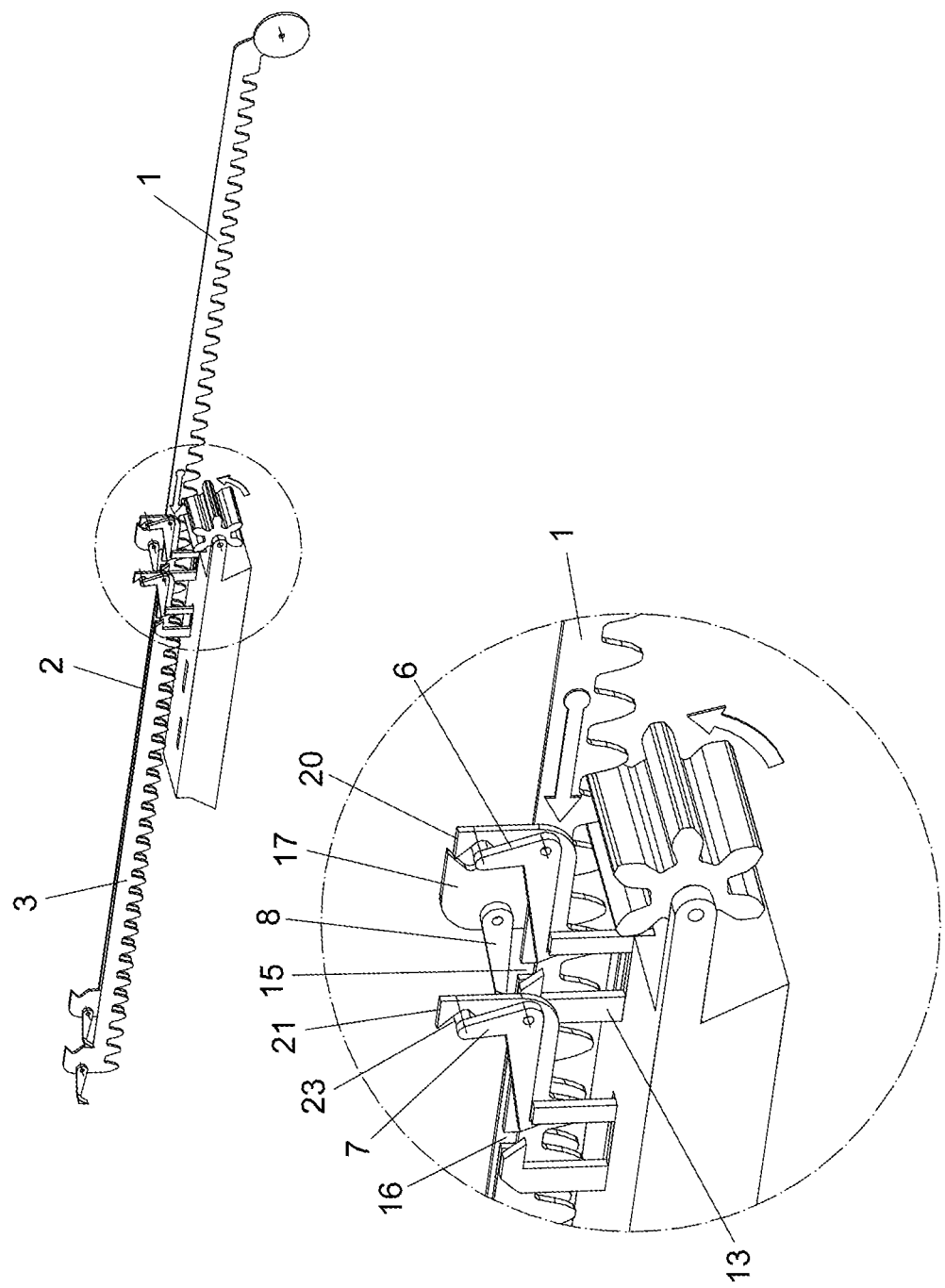

Likewise, FIG. 17 shows the end of the path of the first additional section (2), the first push pawl (8) having come in contact with the first cam (13) and being unanchored from the first recess (15), such that only the pinion (5) moves the initial section (1).

The movement of the initial section (1) ends when the initial section (1) reaches the end of its trajectory.

It should be noted that it is very important that the teeth of the three sections (1, 2, 3) be synchronized, such that the device is not affected by the fact that the arm is being retracting or extending, being able to alternatively come or go as many times as established. This is produced by the position of the pull pawls (6, 7) and the push pawls (8, 9, 10) that, upon activating the movement of the adjacent section (1, 2, 3), positions it so that the teeth of the different sections (1, 2, 3) are synchronized.

In other embodiments, the brakes (11, 12) and the cams (13, 14) can be incorporated in the segment (1, 2, 3) following that of the movement instead of being in a fixed location.

The present invention should not be limited by the embodiment herein described. Other arrangements may be carried out by those skilled in the art based on the present description. Accordingly, the scope of the invention is defined by the following claims.

The invention claimed is:

1. An internal washing device for containers comprising a base with a structure including an initial section and at least one additional section, telescopically extendable from a forward end to a rear end and in which at least one cleaning element is housed, wherein:
   the base comprises a drive shaft activated by a motor,
   each section comprises at least one toothed longitudinal segment configured to engage with at least one pinion fastened to the drive shaft,
   each section comprises a push pawl on the rear end,
   the initial section incorporates a support element on the forward end, and
   each additional section incorporates a pull pawl on the forward end, and a recess for the fastening of the corresponding push pawl, and
   the toothed longitudinal segments of the sections are parallel and are activated by the pinions of the drive shaft, such that the drive shaft has the ability to operate all the sections without needing to move.

2. The internal washing device for containers according to claim 1, wherein each section comprises two toothed segments.

3. The internal washing device for containers according to claim 1, further comprising a pinion for engaging with each toothed segment of each section.

4. The internal washing device for containers according to claim 1, wherein
   the base comprises at least one set formed by a brake and a cam,
   each section comprises the push pawl and a stop on the rear end,
   the initial section incorporates a support element on the forward end,
   each additional section comprises a head and the pull pawl with a bolt on the rear end, and a recess, and
   the push pawls comprise a protrusion with a width configured so that first and second of the push pawls fit into first and second of the recesses and at the same time come in contact with first and second of the cams, respectively,
   both first and second of the stops and first and second of the heads comprise a recess for housing first and second of the bolts, respectively.

5. The internal washing device for containers according to claim 1, wherein each section comprises a support element on the forward end.

6. The internal washing device for containers according to claim 5, wherein the support element comprises a pair of wheels.

7. The internal washing device for containers according to claim 1, wherein the base comprises a support moved from the center of gravity of the device in a resting state, such that the device is supported on the support and on the end opposite a working area.

8. The internal washing device for containers according to claim 7, wherein the support comprises wheels for moving configured to be locked.

9. The internal washing device for containers according to claim 2, further comprising a pinion for engaging with each toothed segment of each section.

10. The internal washing device for containers according to claim 2, wherein the base comprises a support moved from the center of gravity of the device in a resting state, such that the device is supported on the support and on the end opposite a working area.

11. The internal washing device for containers according to claim 3, wherein the base comprises a support moved from the center of gravity of the device in a resting state, such that the device is supported on the support and on the end opposite a working area.

12. The internal washing device for containers according to claim 4, wherein the base comprises a support moved from the center of gravity of the device in a resting state, such that the device is supported on the support and on the end opposite a working area.

13. The internal washing device for containers according to claim 5, wherein the base comprises a support moved from the center of gravity of the device in a resting state, such that the device is supported on the support and on the end opposite a working area.

14. The internal washing device for containers according to claim 6, wherein the base comprises a support moved from the center of gravity of the device in a resting state, such that the device is supported on the support and on the end opposite a working area.

* * * * *